C. F. PIKE.
TRAP FOR CATCHING PORPOISES.
APPLICATION FILED APR. 9, 1908. RENEWED MAR. 1, 1910.
972,234.
Patented Oct. 11, 1910.
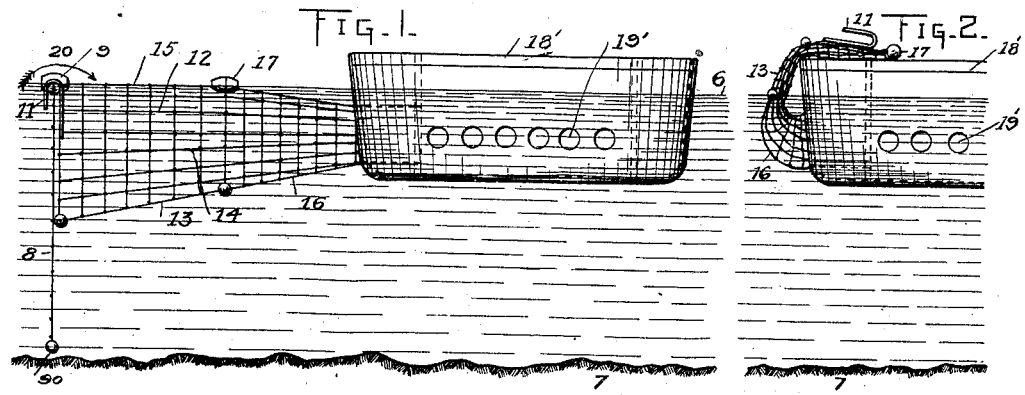
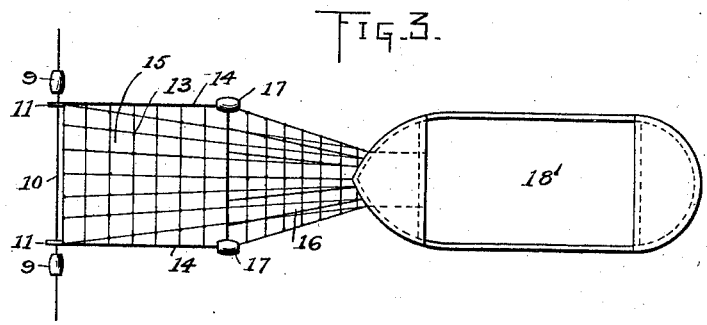
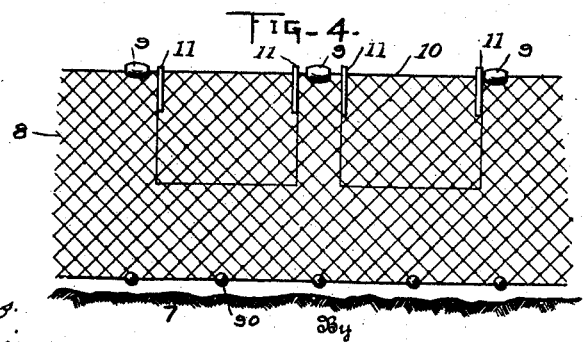
Witnesses
Inventor
CHAS. F. PIKE.
Attorney

UNITED STATES PATENT OFFICE.

CHARLES F. PIKE, OF PHILADELPHIA, PENNSYLVANIA.

TRAP FOR CATCHING PORPOISES.

972,234.  Specification of Letters Patent.  Patented Oct. 11, 1910.

Application filed April 9, 1908, Serial No. 426,048. Renewed March 1, 1910. Serial No. 546,739.

*To all whom it may concern:*

Be it known that I, CHARLES F. PIKE, a citizen of the United States, residing at Philadelphia, in the county of Philadelphia and State of Pennsylvania, have invented certain new and useful Improvements in Traps for Catching Porpoises, of which the following is a specification.

My invention relates to devices for catching fish and especially for catching the porpoise. In this art as heretofore developed means have been provided for this purpose which comprise in general terms obstructions, such as nets or seines, placed in the path traveled by the fish, and in the rear thereof receptacles with forward openings coinciding with openings in the obstructions, whereby the fish upon encountering the obstruction will pass through the opening therein into the receptacle in the rear thereof. The porpoise generally swim near the surface of the water and while they will to some extent pass through the opening in the obstruction placed in their path, they will be very liable when they meet an obstruction, to jump over it and thus be lost to the fisherman.

The object of my invention is to provide means whereby the fish will be caught after jumping over the obstruction and thus avoid the loss of such a large number as would occur in the use of the means now provided.

The invention, subject matter of this application, consists in specific constructions of means for carrying out the broad idea of providing means for catching the fish which may jump over an encountered obstruction, the construction, arrangement and combination of such means being hereinafter fully described and afterward specifically claimed.

In order that others skilled in this art may be enabled to construct and use my invention I will now proceed to describe the same in connection with the accompanying drawings in which—

Figure 1 is a view in side elevation of my invention in position for use. Fig. 2 is a similar view of the receptacle in the rear of the obstruction disconnected therefrom, part of the receptacle being broken away. Fig. 3 is a top plan view of the construction shown in Fig. 1. Fig. 4 is a front elevation of the obstruction.

Referring specifically to Figs. 1 and 2 of the drawing, 6 indicates the surface and 7 the bottom of a body or stream of water in which my invention may be utilized. An obstruction, in this instance shown as an ordinary seine is shown at 8 supported by floats of any ordinary kind, as at 9, and held down by weights or sinkers 90. In the rear of the obstruction, that is to say on that side opposite to the one with which the porpoise would come into contact, is removably secured on the float line 10, by hooks 11 or other suitable means, a receptacle, as at 12, in this instance shown as a trap or net, having a bottom 13 and sides 14, 14, but open at the top, as at 15. Extending rearwardly from the open rear end of this trap 12, is a conically shaped tubular conduit, 16, supported by floats 17 and connecting at its rear open end with a receptacle, shown in Fig. 1 as a live box 18′ having water tight compartments, and circulatory openings 19′.

The porpoise, in swimming along, encounters the obstruction, in the form of the seine 8 and being unable to pass through it, jumps over it, in the direction indicated by the arrow 20, and drops into the trap, and continuing on in the same general direction, is guided through the conduit or connection 16, from which the contents may be removed in any suitable manner.

The live-box 18′ may be removed and floated off to any point at which it may be desired to remove its contents, in which case the net and conduit, detached from the obstruction by removing the hook 11 therefrom, may be thrown upon the top of the live-box, as clearly shown in Fig. 2.

There may be as many traps set as desired or as permissible in any particular situation.

The construction described may be modified in many ways without departing from the spirit of the invention.

Having thus fully described my invention, what I claim as new is:

1. A device of the character described comprising an obstruction in the path of the porpoise, a trap securable to the rear side of the obstruction and provided with an open rear end and an open top to receive the fish jumping over the obstruction, a conduit connected to the open rear end of the trap, and a receptacle secured to the open rear end of the conduit, substantially as described.

2. A device of the character described comprising an obstruction in the path of the porpoise, a trap removably securable to the rear side of the obstruction and provided with an open rear end and an open top to receive the fish jumping over the obstruction, a conduit connected to the open rear end of the trap, and a receptacle secured to the open rear end of the conduit, the trap and conduit being flexible and adapted to be loaded on the receptacle and carried with it, substantially as described.

In testimony whereof I affix my signature in presence of two witnesses.

CHARLES F. PIKE.

Witnesses:
    JOHN DEVLIN,
    FRANK GRAY.